(12) United States Patent
Ryu et al.

(10) Patent No.: US 11,300,837 B2
(45) Date of Patent: Apr. 12, 2022

(54) METHOD OF APPLYING PARTICLES

(71) Applicant: LG Chem, Ltd., Seoul (KR)

(72) Inventors: Su Young Ryu, Daejeon (KR); Jung Woon Kim, Daejeon (KR); Tae Gyun Kwon, Daejeon (KR); Moon Soo Park, Daejeon (KR)

(73) Assignee: LG Chem, Ltd.

( * ) Notice: Subject to any disclaimer, the term of this patent is extended or adjusted under 35 U.S.C. 154(b) by 88 days.

(21) Appl. No.: 16/307,832

(22) PCT Filed: Jun. 7, 2017

(86) PCT No.: PCT/KR2017/005890
§ 371 (c)(1),
(2) Date: Dec. 6, 2018

(87) PCT Pub. No.: WO2017/213405
PCT Pub. Date: Dec. 14, 2017

(65) Prior Publication Data
US 2019/0212599 A1    Jul. 11, 2019

(30) Foreign Application Priority Data

Jun. 7, 2016  (KR) .................. KR10-2016-0070564
Jun. 7, 2017  (KR) .................. KR10-2017-0070561

(51) Int. Cl.
*G02F 1/1339*     (2006.01)
*C09D 201/00*    (2006.01)
(Continued)

(52) U.S. Cl.
CPC ............ *G02F 1/13392* (2013.01); *C08J 5/18* (2013.01); *C08J 7/0427* (2020.01); *C08J 7/065* (2013.01);
(Continued)

(58) Field of Classification Search
CPC .......... G02F 1/13392; G02F 1/133711; G02F 1/133788; G02F 2001/133715;
(Continued)

(56) References Cited

U.S. PATENT DOCUMENTS

| 5,381,256 A | 1/1995 | Hanyu et al. |
| 2004/0265602 A1* | 12/2004 | Kobayashi ............. B32B 27/36 428/458 |

(Continued)

FOREIGN PATENT DOCUMENTS

| JP | 2-304525 A | * 12/1990 |
| JP | H05273537 A | 10/1993 |

(Continued)

OTHER PUBLICATIONS

Machine Translation of Japanese Patent 2-304525, Date Unknown.*

(Continued)

*Primary Examiner* — Robert S Walters, Jr.
(74) *Attorney, Agent, or Firm* — Lerner, David, Littenberg, Krumholz & Mentlik, LLP

(57) ABSTRACT

The present application relates to a method of applying particles, an optical film and a method of manufacturing an active liquid crystal device. In the method of applying particles of the present application, the particles can be uniformly applied on a base material and fixed while maintaining the shape of particles. The optical film of the present invention produced by the above method can have excellent particle dispersity. A method of manufacturing an active liquid crystal device using the above method can maintain a cell gap uniformly while simplifying the manufacturing process and preventing gravity defects.

10 Claims, 3 Drawing Sheets

(51) Int. Cl.
*G02F 1/1337* (2006.01)
*C08J 7/06* (2006.01)
*C08J 7/04* (2020.01)
*C08J 5/18* (2006.01)
*B82Y 20/00* (2011.01)
*B82Y 30/00* (2011.01)

(52) U.S. Cl.
CPC ...... *C09D 201/00* (2013.01); *G02F 1/133711* (2013.01); *G02F 1/133788* (2013.01); *B82Y 20/00* (2013.01); *B82Y 30/00* (2013.01); *C08J 2333/12* (2013.01); *C08J 2367/02* (2013.01); *C08J 2433/12* (2013.01); *G02F 1/13398* (2021.01); *G02F 1/133715* (2021.01)

(58) Field of Classification Search
CPC . G02F 2001/13398; C08J 7/0427; C08J 5/18; C08J 7/065; C08J 2333/12; C08J 2367/02; C08J 2433/12; C09D 201/00; B82Y 20/00; B82Y 30/00
See application file for complete search history.

(56) References Cited

U.S. PATENT DOCUMENTS

| | | | | |
|---|---|---|---|---|
| 2005/0046782 | A1* | 3/2005 | Kobayashi | G02F 1/141 349/172 |
| 2006/0238693 | A1 | 10/2006 | Yoon | |
| 2007/0182457 | A1 | 8/2007 | Yasuda | |
| 2008/0137025 | A1 | 6/2008 | Ueda | |
| 2008/0297704 | A1 | 12/2008 | Hashimoto | |
| 2009/0079916 | A1 | 3/2009 | Kim et al. | |
| 2020/0124923 | A1* | 4/2020 | Kim | G02F 1/13392 |

FOREIGN PATENT DOCUMENTS

| | | |
|---|---|---|
| JP | H11323196 A | 11/1999 |
| JP | 2003107446 A | 4/2003 |
| JP | 2006195111 A | 7/2006 |
| JP | 2007012484 A | 1/2007 |
| JP | 2016-022459 A | 2/2016 |
| KR | 2005-0115861 A | 12/2005 |
| KR | 2006-0110936 A | 10/2006 |
| KR | 2007-0054425 A | 5/2007 |
| KR | 20080099412 A | 11/2008 |
| KR | 2010-0007441 A | 1/2010 |
| KR | 20100007441 A | 1/2010 |
| KR | 2012-0082310 A | 7/2012 |
| KR | 2015-0137178 A | 12/2015 |
| WO | 2013021965 A1 | 2/2013 |
| WO | WO-2018080089 A1 * | 5/2018 ............. G02B 26/02 |

OTHER PUBLICATIONS

English translation of WO2018080089.*
Search Report from International Application No. PCT/KR2017/005890, dated Sep. 12, 2017.
Extended European Search Report with written opinion for Application No. EP 17810528.4 dated Oct. 15, 2019, 7 pages.

* cited by examiner

[Figure 1]
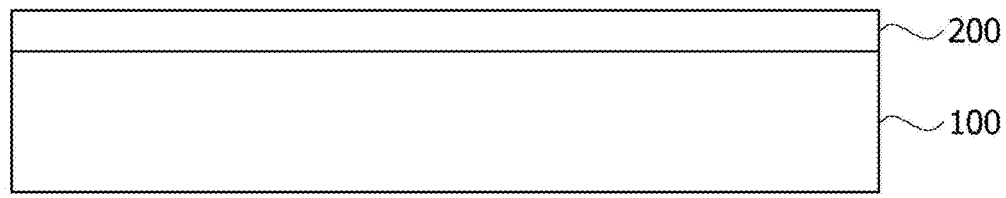
[Figure 2]
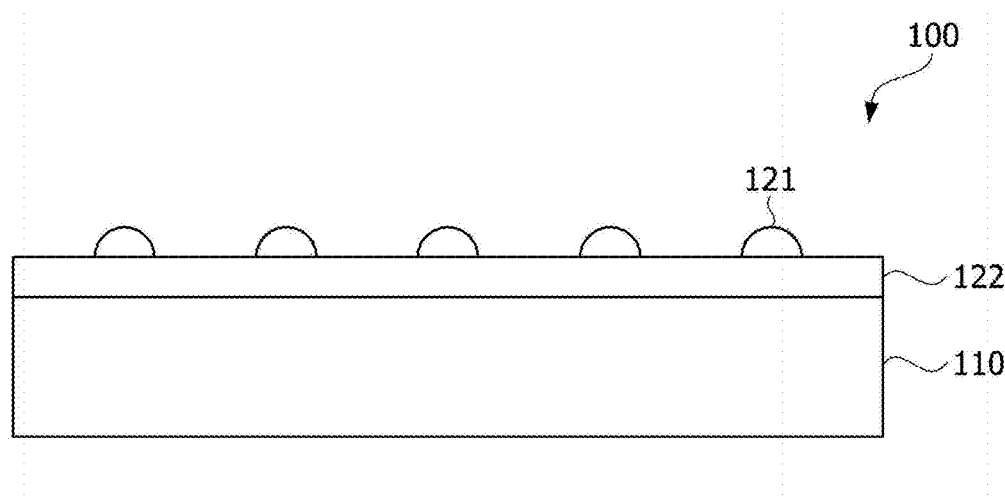
[Figure 3]
| AFM image (10um²) | Example 1 | Example 2 | Example 3 | Example 4 | Example 5 |
|---|---|---|---|---|---|
| Average ($R_a$, nm) | 15.8 | 15.9 | 16.0 | 5.0 | 5.4 |
| 3D image | | | | | |

[Figure 4]
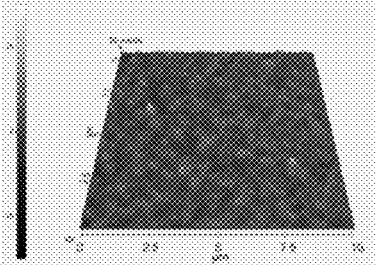
[Figure 5]
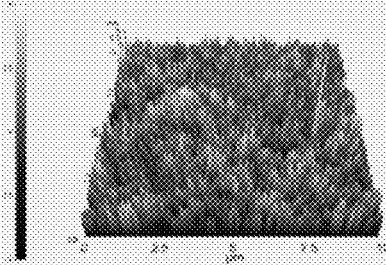
[Figure 6]
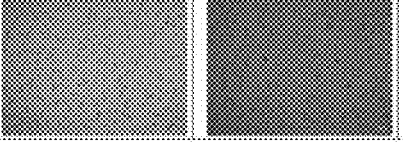

[Figure 7]
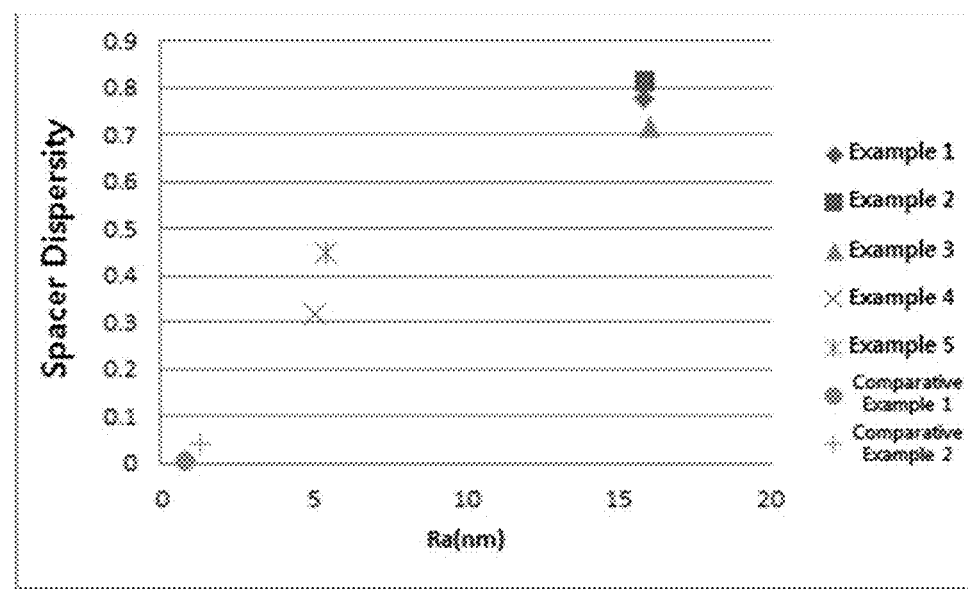

METHOD OF APPLYING PARTICLES

CROSS-REFERENCE TO RELATED APPLICATIONS

This present application is a national phase entry under 35 U.S.C. § 371 of International Application No. PCT/KR2017/005890, filed Jun. 7, 2017, which claims priority to Korean Patent Application No. 10-2016-0070564 filed Jun. 7, 2016, and Korean Patent Application No. 10-2017-0070561, filed Jun. 7, 2017, the disclosures of which are incorporated herein by reference.

The present application relates to a method of applying particles, an optical film and a method of manufacturing an active liquid crystal device.

The present application claims the benefit of priority based on Korean Patent Application No. 10-2016-0070564 filed on Jun. 7, 2016, the disclosure of which is incorporated herein by reference in its entirety.

TECHNICAL FIELD

The present application relates to a method of applying particles, an optical film and a method of manufacturing an active liquid crystal device.

BACKGROUND ART

In order to obtain a uniform screen in a liquid crystal display element, spacers serve to keep a gap between a thin film transistor base material and a color filter base material, that is, a cell gap constant.

In the case of using ball spacers as the spacers, the method of mixing the spacers with an alignment film and coating them on a film has an advantage that the process is simple and the cost is low compared with the method of using column spacers, but there is a problem that it is difficult to apply the spacers so as to be uniformly dispersed. A method for solving such a problem is required.

PRIOR ART DOCUMENT

Patent Document

Patent Document 1: Korean Laid-Open Patent Publication No. 2012-0082310

DISCLOSURE

Technical Problem

The present application provides a method of applying particles in which particles may be uniformly applied and fixed on a base material while maintaining the shape of particles, an optical film with excellent particle dispersity produced by the above method, and a method of manufacturing an active liquid crystal device which has a simple process and is capable of uniformly maintaining a cell gap while preventing gravity defects by using the above method.

Technical Solution

The present application relates to a method of applying particles. The method of applying particles may be, for example, a method capable of uniformly applying and fixing particles on a base material while maintaining the shape of particles.

An exemplary method of applying particles comprises a process of coating a coating composition on a base material followed by drying and curing. The base material may be a base material having a surface roughness (Ra) of 3 nm to 100 nm. The coating composition comprises microparticles, a curable resin and a solvent, and the coating composition may be coated on the base material, and then dried and cured.

The method of applying particles of the present application comprises a process of coating a coating composition comprising microparticles, a curable resin and a solvent on a base material having a surface roughness (Ra) of 3 nm to 100 nm, followed by drying and curing, so that the particles can be uniformly applied and fixed on the base material while maintaining the shape of particles.

FIG. 1 is a diagram illustratively shown for explaining a method of applying particles on a base material. FIG. 1 illustratively shows a state in which the coating composition (200) is coated on the base material (100) having a surface roughness (Ra) of 3 nm to 100 nm. In this specification, the term "base material having a surface roughness (Ra) of 3 nm to 100 nm" may mean, for example, a base material having a surface roughness satisfying the above-mentioned range, and a base material in which the surface roughness satisfying the above-mentioned range is formed by a method as described below.

The lower limit of the surface roughness in the base material may be 3 nm or more, 4 nm or more, or 5 nm or more. If the surface roughness of the base material is excessively small, it may be difficult to uniformly coat the microparticles while maintaining the shape of microparticles. Specifically, when the microparticles are applied to a base material having an excessively small surface roughness, the microparticles themselves are aggregated in the process of drying the solvent, a relatively large amount of the microparticles must be applied to maintain the cell gap constant, and there is a problem to be visible due to increase in size by aggregation.

The upper limit of the surface roughness in the base material may be 100 nm or less, 75 nm or less, 50 nm or less, 25 nm or less, 20 nm or less, or 16 nm or less. If the surface roughness of the base material is excessively large, the unevenness in the plane between two or more microparticles is very large, so that the microparticles can be visually recognized. In this case, when the microparticles are used for holding the cell gap of the active liquid crystal device, the optical performance of the active liquid crystal device may be deteriorated. For example, when the cell gap of the active liquid crystal device is 3 μm, the device using liquid crystals having a refractive anisotropy of 0.1 may have a phase difference of 300 nm. However, when the surface roughness of the base material exceeds 100 nm, it has a difference in the phase difference of 10 nm depending on positions of the microparticles. Therefore, if the surface roughness of the base material becomes slightly non-uniform along some of the base material surface, there may be a problem to be visually recognized.

The base material having the surface roughness (Ra) of 3 nm to 100 nm can be produced by any one of the following processes a) to d).

a) coating a composition comprising nanoparticles, a curable resin and a solvent on a base material, followed by drying and curing;
b) forming a base material with a mold;
c) eroding a flat base material with a partially erodible solvent; and
d) applying physical force to a flat base material.

The base material may comprise a base material film. The type of the base material film is not particularly limited, and for example, one selected from the group consisting of polyethylene terephthalate, polytetrafluoroethylene, polyethylene, polypropylene, polybutene, polybutadiene, vinyl chloride copolymer, polyurethane, ethylene-vinyl acetate, ethylene-propylene copolymer, ethylene-ethyl acrylate copolymer, ethylene-methyl acrylate copolymer and polyimide may be used.

The base material may further comprise a conductive layer formed on the base material film. For example, the base material may be produced by directly adjusting the surface roughness of the base material film to 3 nm to 100 nm by any one of the processes a) to d), or the base material may be produced by directly adjusting the surface roughness of the conductive layer, or the base material may be produced by adjusting the surface roughness of the base material film to 3 nm to 100 nm by any one of the processes a) to d) and then forming the conductive layer.

In one example, the base material having a surface roughness (Ra) of 3 nm to 100 nm may be produced by a) a process of coating a curable composition comprising nanoparticles and a curable resin on a base material, followed by drying and curing.

FIG. 2 is a diagram illustratively showing a base material having an artificially formed surface roughness according to one embodiment. FIG. 2 illustratively shows a base material (100) comprising a coating layer (120) in which a composition comprising nanoparticles (121), a curable resin (122) and a solvent is coated on a base material film (110).

In this specification, the term "nano" may mean a size in nanometers (nm), and for example, a size of 1 nm to less than 1,000 nm, but is not limited thereto. In addition, the term "nanoparticles" herein may mean particles having an average particle diameter in nanometers (nm), and for example, particles having an average particle diameter of 1 nm to less than 1,000 nm, but is not limited thereto.

The nanoparticles may be present in a state dispersed in the curable resin. For example, the nanoparticles may be contained in the curable resin in an amount of 0.1 to 20 parts by weight, and 0.1 to 10 parts by weight, or 0.1 to 5 parts by weight or 1 to 3 parts by weight, relative to 100 parts by weight of the curable resin. By comprising the nanoparticles in the curable composition within the above-mentioned range, the base material can have an excellent surface roughness thereon, and the cell gap of the active liquid crystal device can be uniformly formed by uniformly applying the microparticles on the base material.

As the kind of the nanoparticles, one or more particles selected from the group consisting of polymers, carbons, metals, composites and oxides can be used, without being limited thereto.

The particle diameter of the nanoparticles can be appropriately selected in consideration of the purpose of the present application. For example, the particle diameter of the nanoparticles may be 1 nm to less than 1000 nm. The lower limit of the particle diameter of the nanoparticles may be 10 nm or more or 100 nm or more within the above-mentioned range, and the upper limit of the particle diameter of the nanoparticles may be 800 nm or less or 600 nm or less within the above-mentioned range.

The curable resin means a resin that is cured by ultraviolet rays, and the curable resin may be one comprising an acrylic functional group. For example, as the curable resin, a reactive acrylate oligomer, a multifunctional acrylate monomer, or a mixture thereof can be used. In one example, as the reactive acrylate oligomer, a urethane acrylate oligomer, an epoxy acrylate oligomer, polyester acrylate, polyether acrylate, or a mixture thereof can be used.

In addition, as the multifunctional acrylate monomer, dipentaerythritol hexaacrylate, dipentaerythritol pentaacrylate, pentaerythritol tetraacrylate, pentaerythritol triacrylate, trimethylene propyl triacrylate, propoxylated glycerol triacrylate, trimethylpropane ethoxy triacrylate, 1,6-hexanediol diacrylate, tripropylene glycol diacrylate, ethylene glycol diacrylate, or a mixture thereof can be used.

The curable resin may comprise a photo-alignment resin. In this specification, the term "photo-alignment resin" may mean, for example, a compound which is oriented by a photo-isomerization reaction, a photo-degradation reaction or a photo-dimerization reaction due to light irradiation and exhibits liquid crystal orientation. For example, the photo-alignment resin may be a resin exhibiting liquid crystal orientation through a photo-dimerization reaction by polarized ultraviolet irradiation.

In this specification, the term "liquid crystal orientation" may mean a property capable of orienting liquid crystal molecules, liquid crystal compounds, or precursors thereof adjacent to an alignment film, a photo-alignment resin or a reactant of the resin in a predetermined direction.

As the photo-alignment resin, various resins known in the art can be used, without being limited thereto. As the photo-alignment resin, for example, at least one selected from the group consisting of polyamide, polyimide, polyvinyl alcohol, polyamic acid and polycinnamate can be used.

In this specification, the term "layer of a curable resin" may mean, for example, in the process of coating a composition comprising nanoparticles and a curable resin on the base material film, followed by drying and curing, a layer showing only the thickness of the curable resin except for the size of the nanoparticles of the coated composition. The curable resin (122) may have a layer thickness of 50 nm to 500 nm. The upper limit of the layer thickness in the curable resin may be 400 nm or less or 300 nm or less within the above-mentioned range, and the lower limit of the layer thickness in the curable resin may be 100 nm or more or 200 nm or more. By satisfying the layer thickness of the curable resin with the above-mentioned range, the particle diameter of the nanoparticles is larger than the layer thickness of the curable resin, so that the surface roughness of the base material can be formed.

As the coating method of the composition, a known coating method can be used, and for example, spin coating, bar coating, roll coating, gravure coating, blade coating and the like can be used. The composition can be cured by coating the composition on the base material film through the above method, and then drying the coated composition in an oven at a temperature of about 50° C. to 100° C. for about 1 minute to 3 minutes, followed by ultraviolet irradiation. The ultraviolet irradiation is not limited thereto, and for example, may be performed by being irradiated with ultraviolet rays of 10 mW/cm$^2$ to 500 mW/cm$^2$ or so using a ultraviolet irradiation apparatus (fusion lamp, D bulb).

In another example, a base material having a surface roughness (Ra) of 3 nm to 100 nm may be produced by b) a process of forming the base material with a mold. For example, the surface roughness can be formed by applying a moldable curable resin on a base material film, bonding it together with a mold having a pattern capable of forming a surface roughness in the above-mentioned range and then applying a pressure thereto.

In another example, the base material having a surface roughness (Ra) of 3 nm to 100 nm can be produced by c) a process of partially eroding a flat base material using a partially erodible solvent. For example, the surface roughness can be formed by coating a base material film or an additional coating layer with a solvent having solubility with respect to the base material film or the additional coating layer, followed by drying.

In another example, the base material having a surface roughness (Ra) of 3 nm to 100 nm may be produced by d) a process of applying physical force on a flat base material. For example, the surface roughness can be formed by applying a moldable curable resin on a base material film, and then applying a pressure thereon to form a surface roughness in the above-mentioned range.

In this specification, the term "micro" may mean a size in micrometers (μm) and may mean, for example, a size of 1 μm to less than 1,000 μm, but is not limited thereto. In addition, the term "microparticles" herein may mean particles having an average particle diameter in micrometers (μm), and may mean, for example, particles having an average particle diameter in the range of 1 μm to less than 1,000 μm, but is not limited thereto.

The microparticles may be dispersed and present in a state fixed on the base material. In this specification, the term "fixed" means that a thing or the like is firmly adhered. The microparticles can function to uniformly form a cell gap of the active liquid crystal device by being dispersed in a state fixed on the base material having a surface roughness (Ra) formed by any one method of the processes a) to d).

As the kind of the microparticles, at least one selected from the group consisting of polymers, carbons, composites and oxides can be used.

The particle diameter of the microparticles can be suitably selected in consideration of the purpose of the present application. For example, the microparticles may have a particle diameter of 1 μm to less than 100 μm, 3 μm to 80 μm, 5 μm to 50 μm or 8 μm to 30 μm. The microparticles may be dispersed and presented in a state fixed on the base material by having a particle diameter within the above-mentioned range.

If the particle diameter of the microparticles is too small, the cell gap becomes too small when they are used as ball spacers of a liquid crystal device, and thus due to deformation of the optical film, the cell gap of the desired liquid crystal device can be hardly realized. When more microparticles are applied to minimize deformation of the optical film, there may be a problem to lower the transmittance of the liquid crystal device. In addition, if the particle diameter of the microparticles is too small, the amount of the alignment film occupied in the active liquid crystal device to be described below is too large to keep the shape of the particles as they are. Accordingly, it may be difficult to maintain the cell gap of the active liquid crystal device through the microparticles. Furthermore, if the amount of the alignment film, which serves to fix the microparticles, is reduced to solve the problem, there may be a problem that the microparticles are easily separated due to external factors. Also, if the particle diameter of the microparticles is too large, the microparticles can be visually observed even though the microparticles are uniformly dispersed, thereby deteriorating optical performance of a liquid crystal device.

The density of the microparticles is from 0.61 g/cm$^3$ to 2.1 g/cm$^3$, which may be greater than the density of the solvent. For example, the lower limit of the density in the microparticles may be 0.7 g/cm$^3$ or more, 0.8 g/cm$^3$ or more, or 0.9 g/cm$^3$ or more, and the upper limit of the density in the microparticles may be 1.5 g/cm$^3$ or less. By having the microparticles with a density within the above-mentioned range, which is larger than the density of the solvent, the microparticles have a fast sedimentation speed into the surface of the base material in the process of coating on the base material the coating composition comprising the microparticles, the curable resin and the solvent, followed by drying, so that the effect of steric hindrance due to the surface roughness of the base material can be exerted.

In one example, the difference between the density of the microparticles and the density of the solvent may be 0.01 g/cm$^3$ to 0.60 g/cm$^3$, and 0.05 g/cm$^3$ to 0.50 g/cm$^3$, 0.10 g/cm$^3$ to 0.40 g/cm$^3$ or 0.15 g/cm$^3$ to 0.30 g/cm$^3$.

The solvent may have a density of 0.6 g/cm$^3$ to 1.5 g/cm$^3$, and 0.7 g/cm$^3$ to 1.3 g/cm$^3$, 0.8 g/cm$^3$ to 1.1 g/cm$^3$, or 0.9 g/cm$^3$ to 1.0 g/cm$^3$. By having the solvent with a density within the above-mentioned range, which is smaller than the density of the microparticles, the microparticles have a fast sedimentation speed into the surface of the base material in the process of coating on the base material the coating composition comprising the microparticles, the curable resin and the solvent, followed by drying, so that the effect of steric hindrance due to the surface roughness of the base material can be exerted.

Evaporation of the solvent may occur after coating the coating composition comprising the microparticles, the curable resin and the solvent on the base material. At this time, as the roughness of the base material surface acts as a steric hindrance, the microparticles can be prevented from moving depending on the flow of the solvent. For example, the solvent may have a boiling point of 40° C. to 250° C., and 60° C. to 200° C. or 80° C. to 150° C.

As the kind of the solvent, a solvent having a density smaller than that of the above-described microparticles can be used, and for example, one or more selected from the group consisting of aliphatics such as normal hexane, heptane and octane; aromatics such as benzene, toluene and xylene; chlorides such as dichloromethane, trichloromethane and tetrachloromethane; alcohols such as ethanol, isopropanol and butanol; esters such as ethyl acetate, propyl acetate and propylene glycol methyl ether acetate (PG-MEA); ketones such as methyl ethyl ketone (MEK), methyl isobutyl ketone (MIBK), cyclohexanone and cyclopentanone; and ethers such as tetrahydrofuran, petroleum ether, 1,2-dimethoxy ethane (DME) and diethylene glycol dimethyl ether (diglyme) can be used.

In the process of coating the coating composition comprising the microparticles, the curable resin and the solvent on the base material, followed by drying and curing, the coating composition may have a coating thickness of 10 nm to 1000 nm, and 30 nm to 800 nm, 50 nm to 500 nm or 80 nm to 300 nm. By satisfying the coating thickness of the coating composition with the above-described range, the particles can be uniformly coated and fixed on the base material while maintaining the shape of the particles, whereby an optical film having excellent particle dispersity as described below can be produced, and also, it is possible to uniformly form the cell gap of the active liquid crystal device comprising the optical film, to simplify the manufacturing process, and to prevent gravity defects.

As the coating method of the coating composition, a known coating method can be used, and for example, spin coating, bar coating, roll coating, gravure coating, blade coating and the like can be used. The coating composition can be cured by coating the coating composition on the base material through the above method, and then drying the coated composition in an oven at a temperature of about 80° C. to 130° C. for about 1 minute to 3 minutes, followed by ultraviolet irradiation. The ultraviolet irradiation is not limited thereto, and for example, may be performed by being irradiated with ultraviolet rays of 10 mW/cm² to 500 mW/cm² or so using a ultraviolet irradiation apparatus (fusion lamp, D bulb).

The coating composition may comprise the microparticles in an amount of 0.1 to 10 parts by weight, relative to 100 parts by weight of the solvent. Specifically, the lower limit of the microparticle content may be 0.5 parts by weight or more or 0.1 parts by weight or more, relative to 100 parts by weight of the solvent within the above-mentioned range, and the upper limit of the the microparticle content may be 8 parts by weight or less or 5 parts by weight or less within the above-mentioned range. As the coating composition comprises the microparticles within the above-mentioned range, the microparticles can be uniformly applied on the base material to uniformly form the cell gap of the active liquid crystal device, to simplify the manufacturing process, and to prevent gravity defects.

The present application also relates to an optical film. For example, the optical film relates to an optical film produced by the method of applying particles as described above. Therefore, the details of the optical film to be described below can be applied equally to the contents described in the method of applying particles. The optical film produced by the above method can have excellent particle dispersity.

The optical film comprises a base material having a surface roughness (Ra) of 3 nm to 100 nm and microparticles applied on the base material. At this time, the microparticles may have a dispersity of 0.5 to 2. The dispersity of the microparticles may be 0.55 to 1.80, 0.60 to 1.50, 0.65 to 1.30, or 0.70 to 1.00 within the above-described range. As the microparticles have a dispersity within the above-mentioned range, it is possible to uniformly form the cell gap of the active liquid crystal device comprising the optical film, to simplify the manufacturing process, and to prevent gravity defects.

The present application also relates to a method of manufacturing an active liquid crystal device. The above manufacturing method relates to, for example, a method of manufacturing an active liquid crystal device using the method of applying particles as described above. Therefore, the details of the method of manufacturing the active liquid crystal device, as described below, can be applied equally to the contents described in the method of applying particles. The active liquid crystal device manufactured by the above method can maintain the cell gap evenly while simplifying the manufacturing process and preventing gravity defects.

The method of manufacturing the active liquid crystal device may comprise processes of coating a coating composition comprising microparticles, a photo-alignment resin and a solvent on a lower base material having a surface roughness (Ra) of 3 nm to 100 nm, followed by drying and curing, to form a photo-alignment film, and forming a liquid crystal layer on the photo-alignment film.

In this specification, the active device means a device requiring an energy source for operation and outputting functions of present and past input signals.

The active liquid crystal device herein means a device that functions to modulate incident light using optical properties of liquid crystals depending on the change in the arrangement of the liquid crystals induced by applying an energy source to the liquid crystal layer. The energy source may be, for example, a voltage.

The liquid crystal layer may comprise liquid crystal compounds that are variously known in the art to achieve the purpose of the present application, without being limited thereto. For example, the liquid crystal layer may be formed by using a known liquid crystal compound.

The method of manufacturing the active liquid crystal device of the present application may further comprise a process of laminating an upper base material on the liquid crystal layer. At this time, the microparticles can function as spacers that maintain a gap between the lower base material and the upper base material.

The lower base material or the upper base material may comprise a base material film and an electrode layer on the base material film. The electrode layer may comprise electrodes that are variously known in the art to achieve the purpose of the present application, and may comprise, for example, ITO.

Effects of the Invention

The method of applying particles of the present application can uniformly apply and fix the particles on the base material while maintaining the shape of the particles. The optical film produced by the above method can have excellent particle dispersity. The method of manufacturing the active liquid crystal device using the above method can maintain the cell gap uniformly while simplifying the manufacturing process and preventing gravity defects.

BRIEF DESCRIPTION OF THE DRAWING

FIG. 1 is a diagram illustratively shown for explaining a method of applying particles on a base material.

FIG. 2 is a diagram illustratively showing a base material having an artificially formed surface roughness according to one embodiment.

FIG. 3 shows AFM images of the base materials produced in Examples 1 to 5.

FIG. 4 shows AFM images of the base materials produced in Comparative Examples 1 and 2.

FIG. 5 shows optical microscope images of the base materials produced in Examples 1 to 5.

FIG. 6 shows optical microscope images of the base materials produced in Comparative Examples 1 and 2.

FIG. 7 shows graphs of roughness and microparticle dispersity in the base materials produced in Examples 1 to 5 and Comparative Examples 1 and 2.

DETAILED DESCRIPTION OF THE INVENTION

Hereinafter, the present application will be described in more detail by way of examples according to the present application and comparative examples not complying with the present application, but the scope of the present application is not limited by the following examples.

Hereinafter, physical properties in Examples and Comparative Examples were evaluated in the following manner.

1. Roughness Measurement

For a base material prior to coating of a ball spacer composition, the surface roughness (Ra) value in an area of 10 μm×10 μm was measured using an AFM (NX10, Park systems) equipment.

2. Dispersity Evaluation

For the base material fixed with ball spacers, the number of ball spacers in a reference area (1 mm²) was measured using an optical microscope (BX51, OLYMPUS Co., Ltd.) at ×40 magnification, and then a value obtained by dividing the number of ball spacers that are not agglomerated by the total number of ball spacers was evaluated as the dispersity.

Example 1

Production of Base Material

Polymethylmethacrylate (PMMA) particles (XX-52BQ, SEKISUI) having a particle diameter of 370 nm and an alignment film (5-norbornene-2-methyl-(4-methoxycinnamate)) from the present applicant were mixed in a solvent of cyclohexanone (cyclohexanone 99%, DAEJUNG Chemicals & Metals Co., Ltd.) to prepare a nanoparticle composition (a weight ratio of solvent:PMMA particles:alignment film from the present applicant=100:0.1:4). The nanoparticle composition was coated on a polyethylene terephthalate (PET, COSMOSHINE® A4300 125 μm, TOYOBO) base material film (width×length=100 mm×100 mm) using a mayer bar (#4) to a thickness of about 10 μm. The coated composition was dried in an oven at about 80° C. for about 2 minutes. The dried composition was irradiated with ultraviolet rays having an intensity of about 200 mW/cm² for 10 seconds to cure the base material.

Application of Ball Spacers

Ball spacers (KBN-512, SEKISUI) having a density of 1.19 g/cm³ and a particle diameter of 12 μm and an alignment film (5-norbornene-2-methyl-(4-methoxycinnamate)) from the present applicant were added to a solvent of cyclohexanone (cyclohexanone 99%, DAEJUNG Chemicals & Metals Co., Ltd.) having a density of 0.948 g/cm³, followed by mixing, to prepare a ball spacer composition (a weight ratio of solvent:ball spacer:alignment film from the present applicant=100:1:2). The ball spacer composition was coated on the base material as produced above using a mayer bar (#10) to a thickness of about 25 μm. The coated composition was dried in an oven at about 100° C. for about 2 minutes. The dried composition was irradiated with ultraviolet rays having an intensity of about 200 mW/cm² for 10 seconds and cured to apply the ball spacers on the base material. The ball spacers were fixed on the base material and applied in a dispersed state.

Example 2

The ball spacers were coated in the same manner as in Example 1, except that the base material film was changed to polyethylene terephthalate (PET, TH46H, SKC, length×width=100 mm×100 mm).

Example 3

The ball spacers were coated in the same manner as in Example 1, except that the base material film was changed to polyethylene terephthalate (PET, U48, Toray, length×width=100 mm×100 mm).

Example 4

The ball spacers were coated in the same manner as in Example 1, except that the ball spacer composition was directly coated on a polyethylene terephthalate (PET, COSMOSHINE® A4300, TOYOBO) base material film, and dried and cured.

Example 5

The ball spacers were coated in the same manner as in Example 3, except that the spacer composition was directly coated on a polyethylene terephthalate (PET, U48, Toray) base material film, dried and cured.

Comparative Example 1

The ball spacers were coated in the same manner as in Example 1, except that polymethylmethacrylate (PMMA) particles were not mixed at the time of manufacturing the base material.

Comparative Example 2

The ball spacers were coated in the same manner as in Example 2, except that the ball spacer composition was directly coated on the polyethylene terephthalate (PET, TH46H, SKC) base material film, and dried and cured.

TABLE 1

| Classification | Example | | | | | Comparative Example | |
| --- | --- | --- | --- | --- | --- | --- | --- |
| | 1 | 2 | 3 | 4 | 5 | 1 | 2 |
| Roughness (nm) | 15.8 | 15.9 | 16.0 | 5.0 | 5.4 | 0.8 | 1.3 |
| Dispersity | 0.78 | 0.81 | 0.72 | 0.32 | 0.45 | 0.004 | 0.04 |

As shown in Table 1 and FIGS. 3 to 7, it can be confirmed that the ball spacers in Examples 1 to 5 using the base material satisfying the surface roughness of the present application have excellent dispersity, as compared with Comparative Examples 1 and 2 using the base material not satisfying the surface roughness of the present application.

EXPLANATION OF REFERENCE NUMERALS

100: base material
110: base material film
120: coating layer
121: nanoparticles
122: photo-curable resin
200: coating composition

The invention claimed is:

1. A method manufacturing an active liquid crystal device, comprising:
    coating a coating composition comprising microparticles, a photo-alignment resin and a solvent on a first base material having a surface roughness (Ra) of from 3 nm to 100 nm,
    drying and curing the coating composition to form a photo-alignment film;
    forming a liquid crystal layer on the photo-alignment film; and
    laminating a second base material on the liquid crystal layer,
    wherein the microparticles maintain a gap between the first and second base materials, and
    wherein said microparticles have a density of 0.61 g/cm³ to 2.1 g/cm³, and the density of said microparticles is greater than the density of the solvent.

2. The method according to claim 1,
    wherein said first base material having a surface roughness (Ra) of 3 nm to 100 nm is produced by any one of the following processes a) to d):
    a) coating a composition comprising nanoparticles, a curable resin and a solvent on a base material, followed by drying and curing;
    b) forming a base material with a mold;
    c) eroding a flat base material with a partially erodible solvent; and
    d) applying physical force to a flat base material.

3. The method according to claim 2,
wherein said first base material comprises one base material film selected from the group consisting of polyethylene terephthalate, polytetrafluoroethylene, polyethylene, polypropylene, polybutene, polybutadiene, vinyl chloride copolymer, polyurethane, ethylene-vinyl acetate, ethylene-propylene copolymer, ethylene-ethyl acrylate copolymer, ethylene-methyl acrylate copolymer and polyimide.

4. The method according to claim 3,
wherein said first base material further comprises a conductive layer formed on said base material film, and said first base material is produced by adjusting the surface roughness of said first base material film to 3 nm to 100 nm by any one of said processes a) to d) and then forming the conductive layer on said base material film.

5. The method according to claim 1,
wherein said microparticles are dispersed in a state fixed on said first base material.

6. The method according to claim 1,
wherein said microparticles have a particle diameter of 1 µm to less than 100 µm.

7. The method according to claim 1,
wherein said solvent comprises one or more solvents selected from the group consisting of aliphatics, aromatics, chlorides, alcohols, esters, ketones, and ethers.

8. The method of applying particles according to claim 7,
wherein the aliphatics are selected from the group consisting of including normal hexane, heptane and octane,
wherein the aromatics are selected from the group consisting of benzene, toluene and xylene,
wherein the chlorides are selected from the group consisting of dichloromethane, trichloromethane and tetrachloromethane,
wherein the alcohols are selected from the group consisting of ethanol, isopropanol and butanol,
wherein the esters are selected from the group consisting of ethyl acetate, propyl acetate and propylene glycol methyl ether acetate (PGMEA),
wherein the ketones are selected from the group consisting of methyl ethyl ketone (MEK), methyl iso-butyl ketone (MIBK), cyclohexanone and cyclopentanone, and
wherein the ethers are selected from the group consisting of tetrahydrofuran, petroleum ether, 1,2-dimethoxy ethane (DME) and diethylene glycol dimethyl ether (diglyme).

9. The method according to claim 1,
wherein said coating composition has a coating thickness of 10 nm to 1000 nm.

10. The method according to claim 1,
wherein said coating composition comprises the microparticles in an amount of 0.1 to 10 parts by weight, relative to 100 parts by weight of the solvent.

* * * * *